United States Patent
Song et al.

(10) Patent No.: US 7,215,635 B2
(45) Date of Patent: May 8, 2007

(54) APPARATUS FOR TRANSMITTING AND RECEIVING SIGNAL USING ORTHOGONAL CODES AND NON-BINARY VALUES IN CDMA/OFDM SYSTEM AND METHOD THEREOF

(75) Inventors: Seog-Ill Song, Daejon (KR); Hyun-Seo Oh, Daejon (KR); Hyung-Yun Kong, Ulsan (KR)

(73) Assignee: Electronics and Telecommunications Research Institute (KR)

( * ) Notice: Subject to any disclaimer, the term of this patent is extended or adjusted under 35 U.S.C. 154(b) by 1098 days.

(21) Appl. No.: 10/330,800

(22) Filed: Dec. 27, 2002

(65) Prior Publication Data

US 2004/0085919 A1    May 6, 2004

(30) Foreign Application Priority Data

Oct. 30, 2002    (KR)    .................. 10-2002-0066430

(51) Int. Cl.
*H04J 11/00*    (2006.01)
*H04Q 7/00*    (2006.01)
*H04B 7/216*    (2006.01)

(52) U.S. Cl. ............... 370/208; 370/328; 370/335; 370/342; 455/313

(58) Field of Classification Search ............... None
See application file for complete search history.

(56) References Cited

U.S. PATENT DOCUMENTS 5,815,488 A * 9/1998 Williams et al. ............ 370/206
6,771,976 B1 * 8/2004 Koyama ..................... 455/502
6,813,485 B2 * 11/2004 Sorrells et al. .............. 455/313
7,010,048 B1 * 3/2006 Shattil ........................ 375/259
7,161,895 B1 * 1/2007 Sudo .......................... 370/204
7,164,696 B2 * 1/2007 Sano et al. .................. 370/478

FOREIGN PATENT DOCUMENTS

| JP | 1999-298439 | 10/1999 |
|---|---|---|
| KR | 1019990243649 | 11/1999 |
| WO | WO98/59451 | 12/1998 |

OTHER PUBLICATIONS

IEICE Trans. Fundamentals. vol. E81A. No. 7, Jul. 2001.
High speed data transmission using expanded bit durations in multiple parallel coded data streams, 11 pages.
IEEE (c) 2001, Rate Maximization for Multi-Code CDMA with Optimized Signatures, pp. 1375-1379.
IEEE (c) 2001, A New Multi-code/Multi-carrier DS-CDMA System, 6 pages.
Telecommunications Review, Feb. 12, 2002, pp. 210-224.

* cited by examiner

*Primary Examiner*—Chi Pham
*Assistant Examiner*—Melanie Jagannathan
(74) *Attorney, Agent, or Firm*—Blakely Sokoloff Taylor & Zafman (57) ABSTRACT

An apparatus for transmitting and receiving a signal in Code Division Multiple Access/Orthogonal Frequency Division Multiplexing (CDMA/OFDM) system is provided. The apparatus discriminates user signals with a unique spreading code and the orthogonal codes, increases data transmission rate with the non-binary value without increasing of entire bandwidth used by the users, solves signal interference with interleaver and diversity effect of interleaving and OFDM, and maximizes transmission efficiency by varying modulation schemes depending on channel states.

21 Claims, 5 Drawing Sheets

APPARATUS FOR TRANSMITTING AND RECEIVING SIGNAL USING ORTHOGONAL CODES AND NON-BINARY VALUES IN CDMA/OFDM SYSTEM AND METHOD THEREOF

FIELD OF THE INVENTION

The present invention relates to an apparatus for transmitting and receiving a signal in Code Division Multiple Access/Orthogonal Frequency Division Multiplexing system (CDMA/OFDM) and a method thereof, and, more particularly, to an apparatus for transmitting and receiving a signal using orthogonal codes and non-binary values in CDMA/OFDM system, which discriminates user signals with a unique spreading code and the orthogonal codes, increases data transmission rate with the non-binary value without increasing of entire bandwidth used by the users, solves signal interference with interleaver and diversity effect of interleaving and OFDM, and maximizes transmission efficiency by varying modulation schemes depending on channel states, a method thereof, and a computer readable recording medium having a program for implementing the method.

PRIOR ART OF THE INVENTION

In conventional modulation/demodulation schemes, QAM modulation is used to support increasing data transmission rate with limited frequency bandwidth, which has movability problem. In particular, performance in usage is deteriorated due to a distance greater than a certain value in 16 or more-QAM.

On the other hand, since a fact that channel capacity in a same bandwidth is proportional to the number of transmitting/receiving antennas when a Multiple Input Multiple Output (MIMO) antenna is used in a channel having rich scattering characteristic is disclosed, there has been studied application using various signal detecting methods. However, because these methods should have a number of antennas in a mobile station and the rich scattering characteristic should be maintained, it is difficult to implement them. Further, because channel state is variable, using transmission rate proper to the channel is attempted to improve performance.

Because the conventional methods, that increase the data transmission rate with the unique spreading code and the orthogonal codes without increasing the entire bandwidth used by the users, uses binary values, bandwidth increase which is to be reduced occurs due to code spreading for mass capacity increase. Performance deterioration in capacity increase also occurs due to interference between codes within a same transmission band.

SUMMARY OF THE INVENTION

It is an object of the present invention to provide an apparatus for transmitting and receiving a signal using orthogonal codes and non-binary values in CDMA/OFDM system, which discriminates user signals with a unique spreading code and the orthogonal codes, increases data transmission rate with the non-binary values without increasing of entire bandwidth used by the users, solves signal interference with interleaver and diversity effect of interleaving and OFDM, and maximizes transmission efficiency by varying modulation schemes depending on channel states, a method thereof, and a computer readable recording medium having a program for implementing the method.

In accordance with an aspect of the present invention, there is provided a transmitting apparatus of Code Division Multiple Access/Orthogonal Frequency Division Muliplexing (CDMA/OFDM) comprising a first serial/parallel converting unit for performing serial-to-parallel conversion for received external data to be transmitted; mapping units for generating non-binary signals from parallel data converted at the first serial/parallel converting unit; temporally orthogonal coding (TOC) units for converting the non-binary signals generated at the mapping units to data having orthogonality; unique spreading code synthesizing units for spreading the data having orthogonality converted at the temporally orthogonal coding units by multiplying with a unique spreading code; a second serial/parallel converting unit for performing serial-to-parallel conversion for the data spread at the unique spreading code synthesizing units; a complex Inverse Fast Fourier Transform (IFFT) unit for performing IFFT for parallel data converted at the second serial/parallel converting unit; a parallel/serial converting and guard interval inserting unit for performing serial-to-parallel conversion and inserting guard interval for the data IFFTed at the complex IFFT unit; modulating units for modulating the data received from the parallel/serial converting and guard interval inserting unit multiplying with a radio frequency (RF); and a synthesizing unit for synthesizing the data modulated at the modulating units to transmit to the air.

The present invention (the transmitting apparatus) further comprises an interleaving unit for interleaving the spread parallel data received from the second serial/parallel converting unit to output to the complex IFFT unit; and an adaptive modulation controlling unit for estimating channel state by using data from a receiving apparatus and controlling the IFFT unit and the parallel/serial converting and guard inserting unit based on the estimated channel state.

In accordance with another aspect of the present invention, there is provided a receiving apparatus of CDMA/OFDM comprising, demodulating units for demodulating a signal transmitted from a transmitting apparatus by multiplying with an external RF; low pass filtering units for passing low frequency component of the analog signal demodulated at the demodulating units; an analog/digital converting and guard interval inserting discarding unit for converting the analog signal filtered by the low pass filtering units to digital data and discarding the guard interval from the converted digital data; a complex Fast Fourier Transform (FFT) unit for performing complex FFT for the output data of the analog/digital converting and guard interval inserting discarding unit; a first parallel/serial converting unit for converting the parallel data from the complex FFT unit to serial data; unique spreading code synthesizing units for de-spreading the serial data converted at the first parallel/serial converting unit by multiplying with a unique spreading code; de-temporally orthogonal coding (de-TOC) units for converting the orthogonal data from the unique spreading code synthesizing units to non-binary signals having no orthogonality; de-mapping units for recovering binary data from the non-binary signals from the de-temporally orthogonal coding units; and a serial/parallel converting unit for performing serial/parallel conversion for the data recovered by the de-mapping units.

The present invention (the receiving apparatus) further comprises a de-interleaving unit for de-interleaving the FFTed data from the complex FFT unit to output to the first parallel/serial converting unit.

In accordance with still another aspect of the present invention, there is provided a transmitting method for use in a transmitting apparatus of CDMA/OFDM comprising the steps of: (a) at first serial/parallel converting units, performing serial-to-parallel conversion for external data to be transmitted and, at mapping units, generating non-binary signals from the converted parallel data; (b) at temporally orthogonal coding (TOC) units, converting the generated non-binary signal to data having orthogonality; (c) at unique spreading code synthesizing units, spreading the converted orthogonal data by multiplying with a unique spreading code and, at a second serial/parallel converting unit, performing serial-to-parallel conversion for the spread data; (d) at a complex IFFT unit, performing IFFT for the parallel data converted at the step (c); (e) at a parallel/serial converting and guard interval inserting unit, performing serial-to-parallel conversion for the IFFTed data and inserting guard interval; and (f) at modulating units, modulating the guard interval inserted data by multiplying with an external RF and, at a synthesizing means, synthesizing the modulated data to transmit to the air.

The present invention (the transmitting method) further comprises the step (g) of, at an interleaving unit, interleaving the parallel data of the step (c), prior to performing complex IFFT at the step (d).

In accordance with still another aspect of the present invention, there is provided a receiving method for use in a receiving apparatus of CDMA/OFDM comprising the steps of: (a) at demodulating units, demodulating a signal transmitted from a transmitting apparatus by multiplying with an external RF and, at low pass filtering units, passing low frequency component of the demodulated analog signal; (b) at an analog/digital converting and guard interval inserting discarding unit, converting the analog signal filtered in the step (a) by the low pass filtering units to digital data and discarding the guard interval from the converted digital data; (c) at a complex FFT unit, performing complex FFT for the output data of the analog/digital converting and guard interval inserting discarding unit; (d) at a first parallel/serial converting unit, converting the parallel data from the complex FFT means to serial data and, at unique spreading code synthesizing units, de-spreading the serial data converted at the first parallel/serial converting unit by multiplying with a unique spreading code; (e) at de-temporally orthogonal coding (de-TOC) units, converting the orthogonal data from the unique spreading code synthesizing units of the step (d) to non-binary signals having no orthogonality; and (f) at de-mapping units, recovering binary data from the non-binary signals from the de-temporally orthogonal coding units and, at a serial/parallel converting unit, performing serial-to-parallel conversion for the data recovered by the de-mapping units.

The present invention (the receiving method) further comprises the step (g) of, at a de-interleaving means, de-interleaving data that is complex FFTed at the step (c).

In accordance with still another aspect of the present invention, there is provided a computer readable recording medium for recording a program for implementing, in a transmitting apparatus of CDMA/OFDM having a processor, for transmission using orthogonal code and non-binary signal value, the functions of: (a) at first serial/parallel converting unit, performing serial-to-parallel conversion for external data to be transmitted and generating, at mapping units, non-binary signals from the converted parallel data; (b) at temporally orthogonal coding (TOC) units, converting the generated non-binary signal to data having orthogonality; (c) at unique spreading code synthesizing units, spreading the converted orthogonal data by multiplying with a unique spreading code and, at a second serial/parallel converting unit, performing serial-to-parallel conversion for the spread data; (d) at complex IFFT unit, performing IFFT for the parallel data converted in the function (c); (e) at a parallel/serial converting and guard interval inserting unit, performing serial-to-parallel conversion, for the IFFTed data and inserting guard interval; and (f) at modulating units, modulating the guard interval inserted data by multiplying with an external RF and, at a synthesizing unit, synthesizing the modulated data to transmit to the air.

The present invention provides the computer readable recording medium having the program for further implementing the function (g) of, at an interleaving unit, interleaving the parallel data in the function (c) prior to performing complex IFFT of the function (d), and the function (h) of, at an adaptive modulating unit, estimating channel state by using data from a receiving apparatus and controlling the mapping units of the function (a), the complex. IFFT unit of the function (d) and the parallel/serial converting and guard interval inserting unit of the function (e) based on the estimated channel state.

In accordance with still another aspect of the present invention, there is provided a computer readable recording medium for recording a program for implementing for receiving using orthogonal code and non-binary signal value, in a receiving apparatus of Code Division Multiple Access/Orthogonal Frequency Division Multiplexing (CDMA/OFDM) having a processor, the functions of: (a) at demodulating units, demodulating a signal transmitted from a transmitting apparatus by multiplying with an external RF and, at low pass filtering units, passing low frequency component of the demodulated analog signal; (b) at an analog/digital converting and guard interval inserting discarding unit, converting the analog signal filtered in the function (a) by the low pass filtering units to digital data and discarding the guard interval from the converted digital data; (c) at a complex FFT unit, performing complex FFT for the output data of the analog/digital converting and guard interval inserting discarding unit; (d) at a first parallel/serial converting unit, converting the parallel data from the complex FFT unit to serial data and, at a unique spreading code synthesizing unit, de-spreading the serial data converted at the first parallel/serial converting means by multiplying with a unique spreading code; (e) at de-temporally orthogonal coding (de-TOC) units, converting the orthogonal data from the unique spreading code synthesizing units of the function (d) to non-binary signals having no orthogonality; and; (f) at de-mapping units, recovering binary data from the non-binary signals from the de-temporally orthogonal coding units and, at a serial/parallel converting units, performing serial/parallel conversion for the data recovered by the de-mapping units.

The present invention further provides the computer readable recording medium having the program for further implements the function (g) of, at a de-interleaving means, de-interleaving data that is complex FFTed in the function (c)

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

It will be described for a preferred embodiment of the present invention referring to accompanying drawings. A transmitting/receiving method of the present invention will be described in the description of the transmitting/receiving apparatus.

Figure 1A:
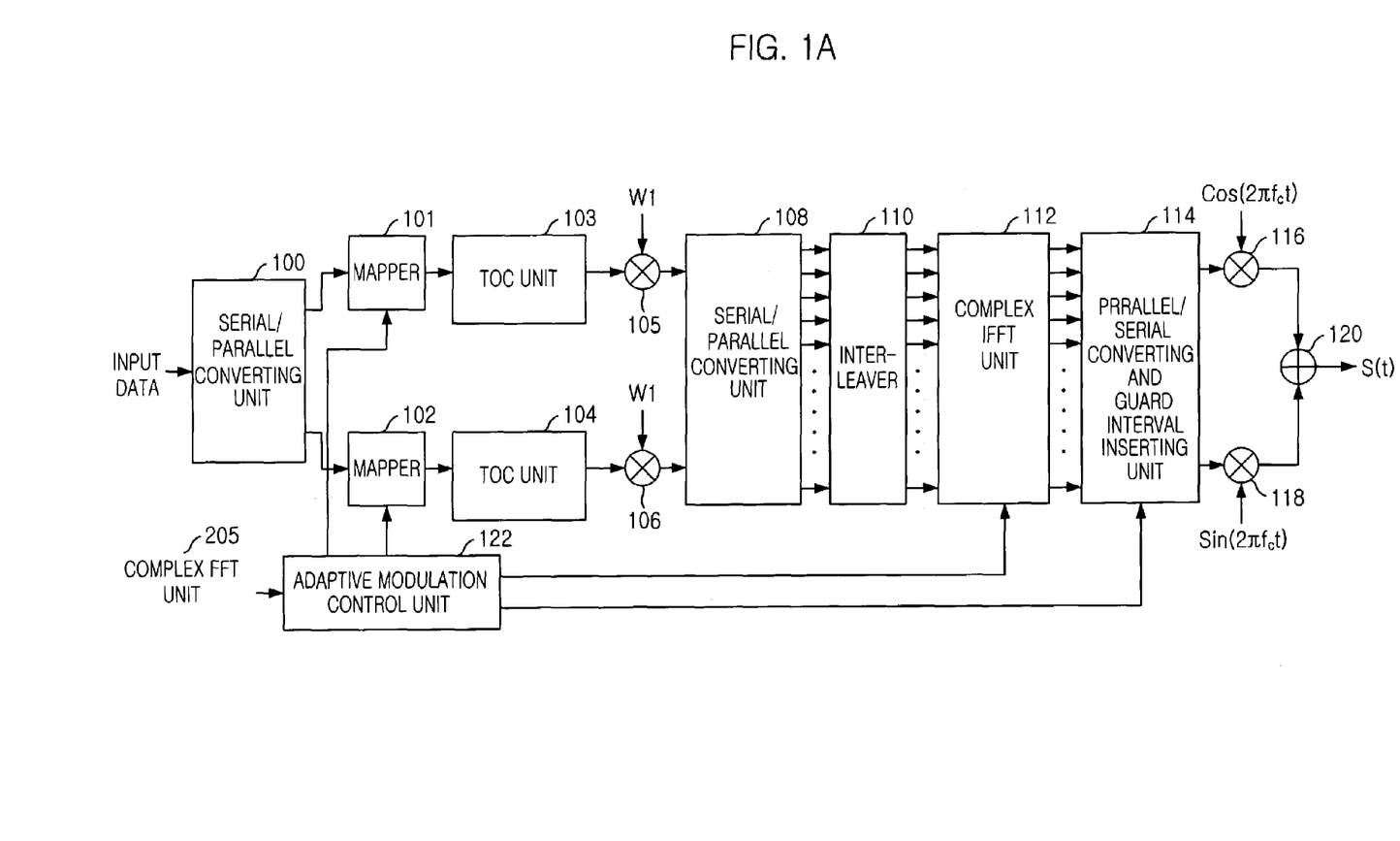
FIG. 1A shows a diagram for configuration of an embodiment of a transmitting apparatus using orthogonal codes and non-binary values in accordance with the present invention.

FIG. 1A is a diagram for configuration of an embodiment of a transmitting/receiving apparatus using orthogonal codes and non-binary values in accordance with the present invention, which comprises mappers 101, 102, temporally orthogonal coding (TOC) units 103, 104, unique-spreading code synthesizing units 105, 106, an interleavers 110, orthogonal frequency division multiplexing (OFDM) unit, including a complex Inverse Fast Fourier Transform (IFFT) unit and a parallel/serial converting and guard interval inserting unit, 112, 114, and an adaptive modulation control unit 122, in order to increase channel capacity with the orthogonal codes and the non-binary values.

Figure 1B:
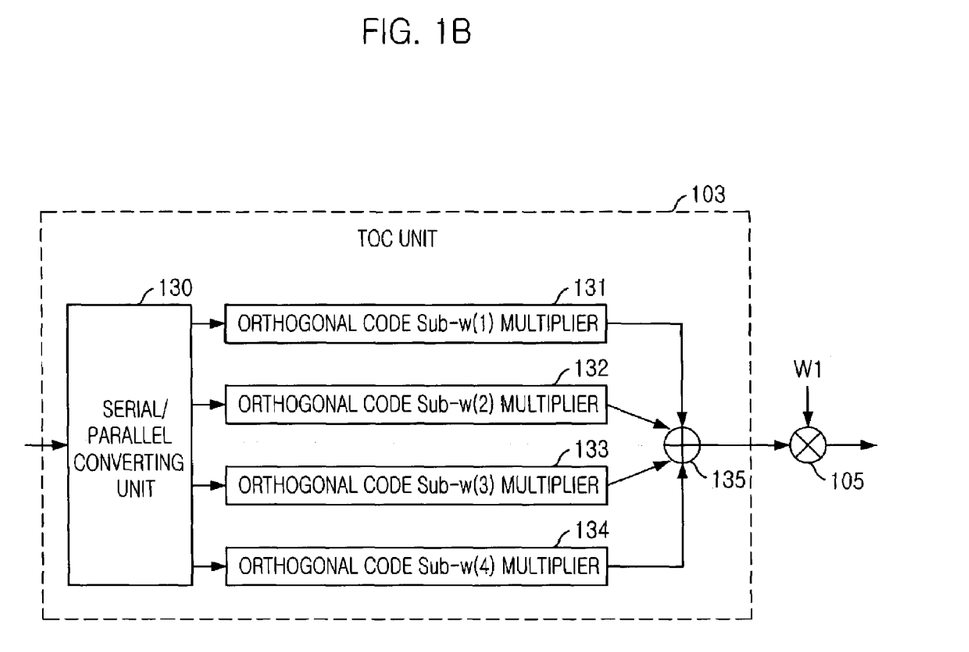
FIG. 1B is a diagram for configuration of an embodiment of a temporally orthogonal coding (TOC) unit in FIG. 1A in accordance with the present invention.

FIG. 1B is a diagram for configuration of an embodiment of the temporally orthogonal coding (TOC) unit in FIG. 1A in accordance with the present invention, which shows a procedure using the orthogonal codes for transmission rate capacity increase.

It will be described for FIG. 1B in description referring to FIG. 1A.

When data is inputted to the transmitting apparatus, the serial/parallel (S/P) converting unit 100 converts the inputted serial data to parallel data and the mappers 101, 102 generate non-binary signal values from the converted data.

The temporally orthogonal coding (TOC) units 103, 104 realize capacity increase by using the orthogonal codes. The unique spreading code synthesizing units 105, 106 synthesize the outputs of the temporally orthogonal coding (TOC) units 103, 104 with a unique spreading code. In particular, such a procedure will be described with non-binary signal values 16-QAM in the following.

Let gray coded non-binary signals from the mappers 101, 102 be $d(1)=(d,-d,3d,d)$ and $d(2)=(-3d,3d,d,-d)$. Here, d is a minimum distance of 16-QAM constellation.

Sub-w(1), Sub-w(2), Sub-w(3) and Sub-w(4) are orthogonal codes, which are multiplied with data from orthogonal code multipliers 131 to 134 of the temporally orthogonal coding (TOC) units 103, 104 (see, FIG. 2B), and W1 is the unique spreading code. The following will be described with each of the orthogonal codes, the unique spreading code and the non-binary signal data. When "0" and "1" are represented as "−" and "+", respectively, the orthogonal codes can be represented as follows:

$$Sub\text{-}w(1)=(1\ 1\ 1\ 1)\to(+\ +\ +\ +)$$

$$Sub\text{-}w(2)=(1\ 0\ 1\ 0)\to(+\ -\ +\ -)$$

$$Sub\text{-}w(3)=(1\ 1\ 0\ 0)\to(+\ +\ -\ -)$$

$$Sub\text{-}w(4)=(1\ 0\ 0\ 1)\to(+\ -\ -\ +). \quad \text{Eq. (1)}$$

The unique spreading code is represented as follows:

$$W1=(0\ 1\ 0\ 1\ 0\ 1\ 0\ 1)\to(-\ +\ -\ +\ -\ +\ -\ +). \quad \text{Eq. (2)}$$

On the other hand, for the non-binary signals that are gray-coded by the mappers 101, 102, $d(1)=(d,-d,3d,d)$ and $d(2)=(-3d,3d,d,-d)$), regarding d as a constant to remove it, results in $d(1)=(+1,-1,+3,+1)$ and $d(2)=(-3,+3,+1,-1)$.

Multiplying the non-binary signal d(1) with the orthogonal codes Sub-w(1), Sub-w(2), Sub-w(3) and Sub-w(4) at the orthogonal code multipliers 131 to 134 of the temporally orthogonal coding unit 103 results in the following equation:

$$C(1)=(+1\ +1\ +1\ +1)$$

$$C(2)=(-1\ +1\ -1\ +1)$$

$$C(3)=(+3\ +3\ -3\ -3)$$

$$C(4)=(+1\ -1\ -1\ +1) \quad \text{Eq. (3)}$$

Summation of the results in Eq. (3) produces (+4 +4 −4 0) at an adder 135. Multiplying this summation result with the unique spreading code W1 results in (−4 +4 −4 +4 +4 −4 0 0) at a multiplier 105, which is the input of the serial/parallel converting unit 108.

On the other hand, similarly, in the temporally orthogonal coding unit 104, multiplying the non-binary signal d(2) with the orthogonal codes Sub-w(1), Sub-w(2), Sub-w(3) and Sub-w(4) makes $C(1)=(-3\ -3\ -3\ -3)$, $C(2)=(+3\ -3\ +3\ -3)$, $C(3)=(+1\ +1\ -1\ -1)$ and $C(4)=(-1\ +1\ +1\ -11)$(see, FIG. 1B) and summation of C(1)-C(4) at the adder 135 results in (0 −4 0 −8). Multiplying this summation result with the unique spreading code W1 results in (0 0 +4 −4 0 0 +8 −8) at the multiplier 106, which is the input of the serial/parallel converting unit 108.

Then, the output of the unique spreading code multiplier 105 (−4 +4 −4 +4 +4 −4 0 0) is serial-to-parallel converted at the serial/parallel converting unit 108 and pass through the interleaver 110 to be inputted as a real input value of the complex IFFT unit 112.

On the other hand, the output of the unique spreading code multiplier 106 (0 0 +4 −4 0 0 +8 −8) is serial-to-parallel converted at the serial/parallel converting unit 108 and pass through the interleaver 110 to be inputted as an imaginary input value of the complex IFFT unit 112.

The parallel/serial converting and guard interval inserting unit 114 inserts guard interval into data from the output of the complex IFFT 112 and then performs parallel-to-serial conversion.

The multiplying units i.e., modulating units 116, 118 modulate data from the parallel/serial converting and guard interval inserting unit 114 by multiplying with external radio frequency (RF) $\cos(2\pi f_c t)$, $\sin(2\pi f_c t)$ and the synthesizing unit 120 synthesizes the two modulated data from the two multiplying units 116, 118 into S(t) to transmit to the air.

The adaptive modulation control unit 122 controls adaptively modulation/demodulation of the non-binary signals depending on transmitting/receiving channel state in order to maximize transmission efficiency. It will be described in detail referring to FIG. 1C.

As shown above, because the output signals of the temporally orthogonal coding units 103, 104 are likely to contain signal error due to external environment such as signal interference and multi path channel, the interleaver 110 and the OFDM modulator/demodulator are provided for diversity effect and interleaving effect in order to solve the signal error.

Figure 1C:
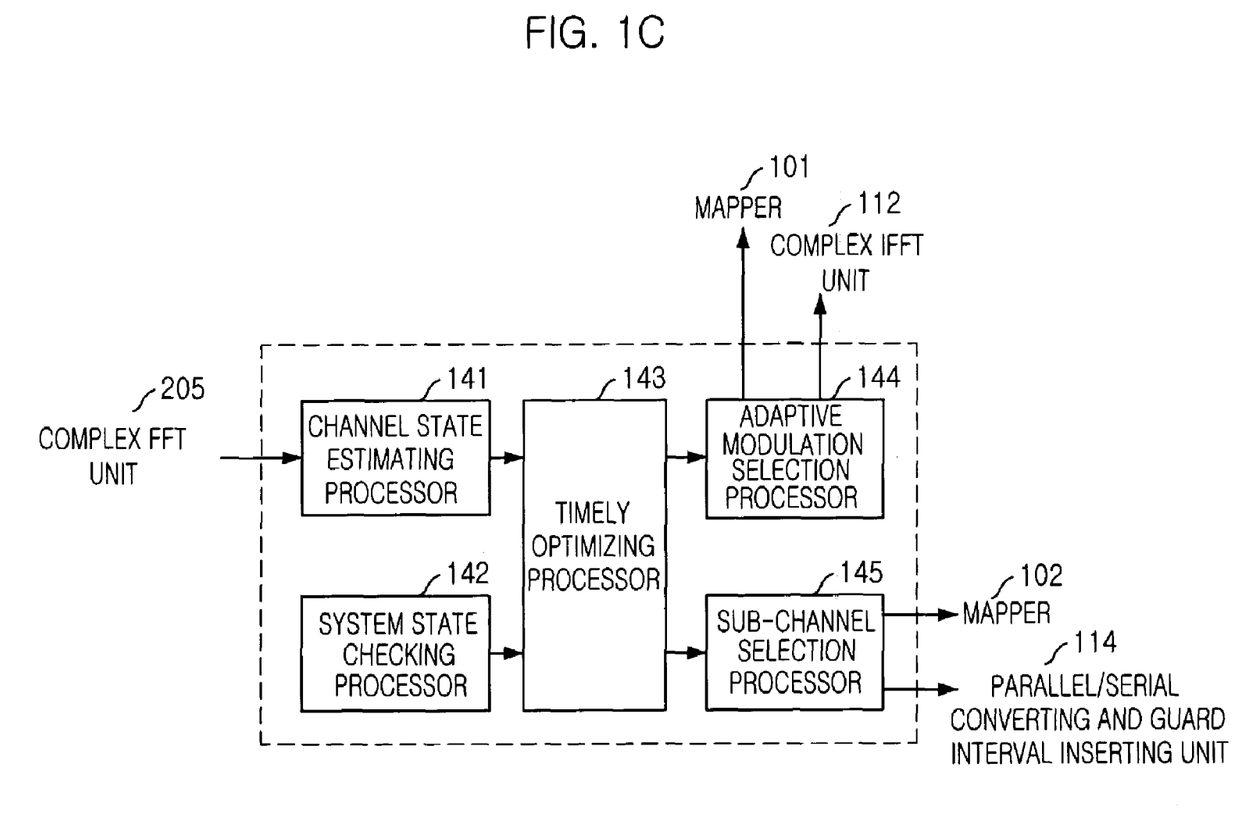
FIG. 1C provides a diagram for configuration of an embodiment of an adaptive modulation control unit in FIG. 1B in accordance with the present invention.

FIG. 1C provides a diagram for configuration of an embodiment of the adaptive modulation control unit in FIG. 1B in accordance with the present invention.

The adaptive modulation control unit 122 maximizes transmission efficiency by adaptively controlling modulation of the non-binary signals depending on transmitting/receiving channel state and includes a channel state estimating processor 141, a system state checking processor 142, a timely optimizing processor 143, an adaptive modulation selection processor 144 and a sub-channel selection processor 145.

The channel state estimating processor 141 estimates channel state between a terminal and a base station. In particular, the channel state estimating processor 141 receives periodically data that is formatted at a complex FFT unit 205 of a receiving apparatus (see, FIG. 2A) and obtains signal to noise ratio (SNR) of some of sub-channels by using this received signal to estimate the channel state between the terminal and the base station by using this SNR. System complexity is reduced in channel estimation by reducing the number of the sub-channels for channel estimation by measuring degree of variation of the neighboring sub-channels.

The system state checking processor 142 checks system state due to system load of the transmitting apparatus itself i.e., state of the transmitting apparatus itself.

The timely optimizing processor 143 computes mean and variance of variation of the SNR of the sub-channel processed at the channel state estimating processor 141 and computes time mean for the system state processed at the system state checking processor 142.

The adaptive modulation selection processor 144 controls the mapper 101 and the complex IFFT unit 112 based on the channel state and the system state by using the output data (time mean, etc.) of the timely optimizing processor 143 so as to perform adaptive modulation. That is, the adaptive modulation selection processor. 144 uses Quadrature Phase Shift Keying (QPSK) in bad environment and non-binary modulation of Quadrature Amplitude Modulation (QAM) in good environment.

The sub-channel section processor 145 controls the mapper 102 and the parallel/serial converting and guard interval inserting unit 114 based on the channel state and the system state by using the output data (time mean, etc.) of the timely optimizing processor 143 to adjust assignment of sub-carriers of the OFDM units 112, 114. That is, the sub-channel selection processor 145 processes the sub-channels of the OFDM units adaptively.

Figure 2A:
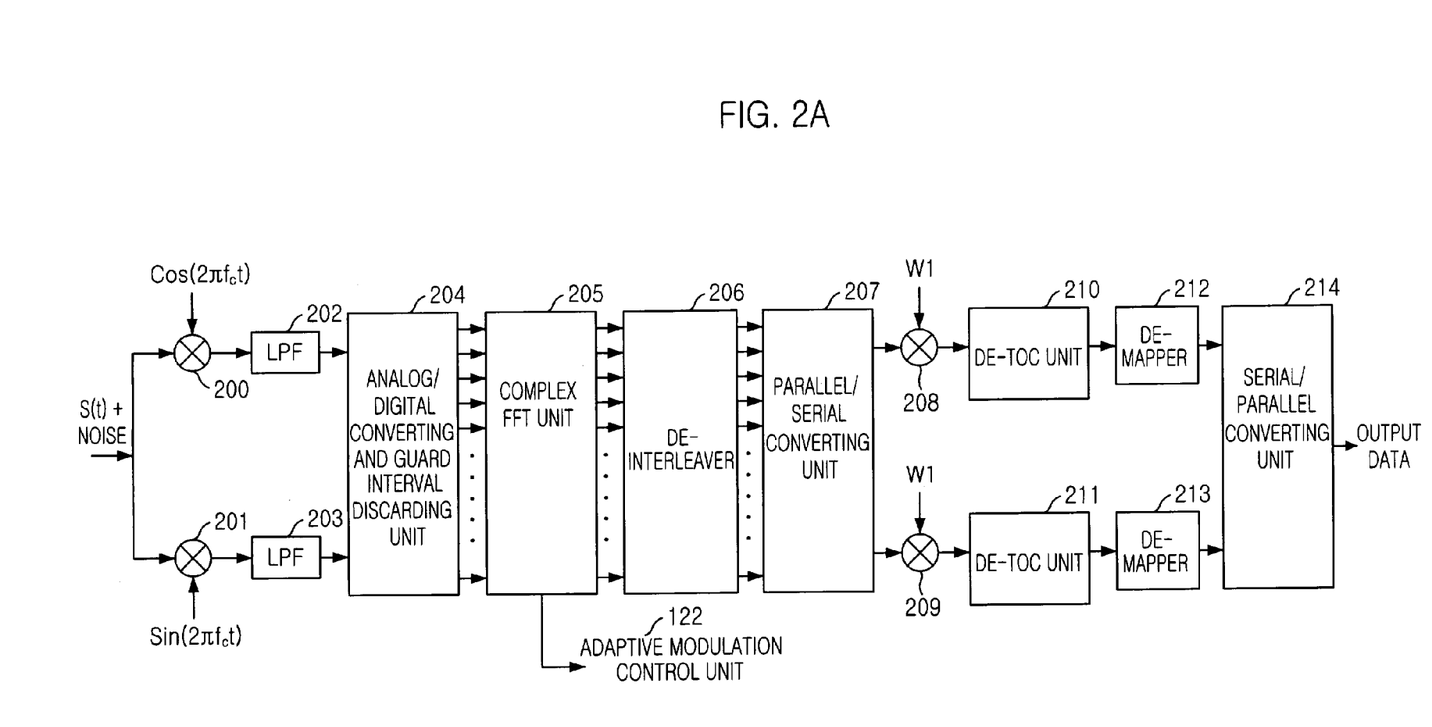
FIG. 2A illustrates a diagram for configuration of an embodiment of a receiving apparatus using orthogonal codes and non-binary values in accordance with the present invention.

FIG. 2A illustrates a diagram for configuration of an embodiment of a receiving apparatus using orthogonal codes and non-binary values in accordance with the present invention.

Inverse procedure for transmitting procedure of FIG. 1a, i.e., a signal recovering procedure of demodulating and de-mapping, will be described in detail in the following.

Multipliers i.e., demodulators 200, 201 multiply a received signal S(t) with external RF to demodulate and a Low Pass Filters (LPFs) 202 203 pass low frequency component and reject high frequency component.

An analog/digital converting and guard interval discarding unit 204 converts the received analog signal, from which RF component is rejected, to digital data and discards the guard interval.

A complex FFT unit 205 performs FFT and then a de-interleaver 206 performs de-interleaving, i.e., inverse process of interleaver 110 of the transmitting side. A parallel/serial (P/S) converting unit 207 converts the output of the de-interleaver 206 from parallel to serial, which outputs (−4 +4 −4 +4 +4 −4 0 0) and (0 0 +4 −4 0 0 +8 −8).

The unique spreading code W1 (same as W1 of the transmitting side) of unique spreading code multiplying units 208, 209 is as represented in Eq. (2). That is, W1=(0 1 0 1 0 1 0 1)→(− + − + − + − +).

Multiplying the output data of the parallel/serial (P/S) converting unit 207 with the unique spreading code W1 at the unique spreading code multiplying units 208, 209 results in the following:

Result of "208": (+4 +4 +4 +4 −4 −4 0 0)

Result of "209": (0 0 −4 −4 0 0 −8 −8).

In a De-temporally orthogonal coding (De-TOC) unit 210, input data (the output of 208) is multiplied with Sub-w(1)~w(4) to make (+4 +4 +4 +4 −4 −4 0 0), (+4 +4 −4 −4 −4 −4 0 0), (+4 +4 +4 +4 +4 +4 0 0) and (+4 +0.4 −4 −4 +4 +4 0 0). Summing up respective values for a period and diving by the period(here, because the period of W1 is 8, the entire integral period is made by integrating ⅛ period for the respective values) and multiplying with d results in (d, −d, 3d, d)(see, FIG. 2B). Then, the de-mapper 212 performs de-mapping to recover the original value.

As similar as described above, input data 209 is multiplied with Sub-w(1)~w(4), respectively, to make (0 0 −4 −4 0 0 −8 −8), (0 0 +4 +4 0 0 +8 +8), (0 0 −4 −4 0 0 +8 +8) and (0 0 +4 +4 0 0 −8 −8) in the de-temporally orthogonal coding (TOC) unit 211. Summing up respective values for a period and diving by the period(here, because the period of W1 is 8, the entire integral period is made by integrating ⅛ period for the respective values) and multiplying with d results in (−3d, 3d, d, −d) (see, FIG. 2B). Then, the de-mapper 213 performs de-mapping to recover the original value.

Figure 2B:
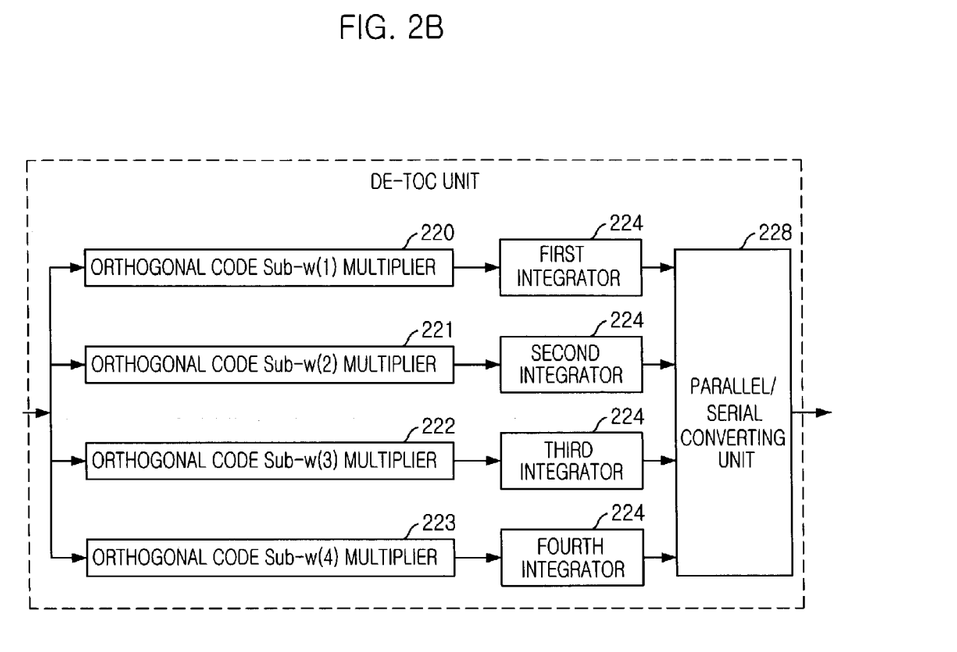
FIG. 2B offers a diagram for configuration of an embodiment of a de-temporally orthogonal coding (De-TOC) unit in FIG. 2A in accordance with the present invention.

FIG. 2B offers a diagram for configuration of an embodiment of a de-temporally orthogonal coding (De-TOC) unit in FIG. 2A in accordance with the present invention.

Orthogonal code multipliers 220 to 223 multiply their input data with orthogonal codes Sub-w(1), Sub-w(2), Sub-w(3) and Sub-w(4). Integrators 224 to 227 integrate their input data. Parallel/serial converter 228 converts the output of the integrators to serial data.

It will be described for integral process in the integrators 224 to 227.

Symbol value of S(t) is recovered in Q channel and I channel. Here, it will be described for only one channel.

First, after multiplying y(t) with the unique spreading code W1 at 209, the de-temporally orthogonal coding (De-TOC) unit 210 performs de-temporally orthogonal coding process to generate (1, −1, 3, 1).

That is, multiplying y(t) with the unique spreading code W1 at 208 and then multiplying with the orthogonal codes Sub-w(1), Sub-w(2), Sub-w(3) and Sub-w(4) at 220 to 223 generates (+4 +4 +4 +4 −4 −4 0 0)(+4 +4 −4 −4 −4 −4 0 0), (+4 +4 +4 +4 +4 +4 0 0) and (+4 +4 −4 −4 +4 +4 0 0).

Integrating them for each ⅛ period at the integrators 224 to 227 leads the following equations.

The output of the first integrator 0.224=

$$\int_0^{1/8} 4 dt + \int_0^{1/8} 4 dt + \int_0^{1/8} 4 dt + \int_0^{1/8} 4 dt +$$

Eq. (4)

$$\int_0^{1/8}(-4)dt + \int_0^{1/8}(-4)dt + \int_0^{1/8}0\,dt + \int_0^{1/8}0\,dt = 1$$

The output of the second integrator 225=

$$\int_0^{1/8}4dt + \int_0^{1/8}4dt + \int_0^{1/8}(-)4dt + \int_0^{1/8}(-4)dt + \quad \text{Eq. (5)}$$
$$\int_0^{1/8}(-4)dt + \int_0^{1/8}(-4)dt + \int_0^{1/8}0\,dt + \int_0^{1/8}0\,dt = -1$$

The output of the third integrator 226=

$$\int_0^{1/8}4dt + \int_0^{1/8}4dt + \int_0^{1/8}4dt + \int_0^{1/8}4dt + \quad \text{Eq. (6)}$$
$$\int_0^{1/8}4dt + \int_0^{1/8}4dt + \int_0^{1/8}0\,dt + \int_0^{1/8}0\,dt = 3$$

The output of the fourth integrator 227=

$$\int_0^{1/8}4dt + \int_0^{1/8}4dt + \int_0^{1/8}(-)4dt + \int_0^{1/8}(-4)dt + \quad \text{Eq. (7)}$$
$$\int_0^{1/8}4dt + \int_0^{1/8}4dt + \int_0^{1/8}0\,dt + \int_0^{1/8}0\,dt = 1$$

The outputs of the integrators, the parallel data, are converted to the serial data at the parallel/serial converter 228 to generate (1, −1, 3, 1) which is multiplied with d to result in (d, −d, 3d, d).

As described above, multiplying with the orthogonal codes Sub-w(1), Sub-w(2), Sub-w(3) and Sub-w(4), respectively, to generate (+4 +4 +4 +4 −4 −4 0 0), (+4 +4 −4 −4 −4 −4 0 0), (+4 +4 +4 +4 +4 +4 0 0) and (+4 +4 −4 −4 +4 +4 0 0) at the multipliers 220 to 223, which are integrated at the integrators 224 to 227. The resultant parallel data is converted to serial data (−3, 3, 1, −1).

As described above, the method of the present invention may be implemented as a program which is stored in a computer readable recording medium such as CD-ROM, RAM, ROM, floppy disk, hard disk, magneto-optical disk and etc.

While the present invention has been shown and described with respect to the particular embodiments, it will be apparent to those skilled in the art that many changes and modifications may be made without departing from the spirit and scope of the invention as defined in the appended claims.

What is claimed is:

1. A transmitting apparatus of Code Division Multiple Access/Orthogonal Frequency Division Muliplexing (CDMA/OFDM) comprising:
    first serial/parallel converting means for performing serial-to-parallel conversion for received external data to be transmitted;
    mapping means for generating non-binary signals from parallel data converted at the first serial/parallel converting means;
    temporally orthogonal coding (TOC) means for converting the non-binary signals generated at the mapping means to data having orthogonality;
    unique spreading code synthesizing means for spreading the data having orthogonality converted at the temporally orthogonal coding means by multiplying with a unique spreading code;
    second serial/parallel converting means for performing serial-to-parallel conversion for the data spread at the unique spreading code synthesizing means;
    complex Inverse Fast Fourier Transform (IFFT) means for performing IFFT for parallel data converted at the second serial/parallel converting means;
    parallel/serial converting and guard interval inserting means for performing serial-to-parallel conversion and inserting guard interval for the data IFFTed at the complex IFFT means;
    modulating means for modulating the data received from the parallel/serial converting and guard interval inserting means multiplying with a Radio Frequency (RF); and
    synthesizing means for synthesizing the data modulated at the modulating means to transmit to the air.

2. The transmitting apparatus as recited in claim 1, further comprising interleaving means for interleaving the spread parallel data received from the second serial/parallel converting means to output to the complex IFFT means.

3. The transmitting apparatus as recited in claim 1, further comprising adaptive modulation controlling means for estimating channel state by using data from a receiving apparatus and controlling the IFFT means and the parallel/serial converting and guard inserting means based on the estimated channel state.

4. The transmitting apparatus as recited in claim 3, the adaptive modulation controlling means includes:
    channel state estimating means for receiving FFTed data for a received signal from the receiving apparatus, computing signal to noise ratio (SNR) of sub-channels of the transmitted data, and estimating channel state by using the SNR;
    system state checking processing means for checking system state due to system load of the transmitting apparatus itself;
    timely optimizing processing means for computing mean and variance for variation of the SNR computed at the channel state estimating means and computing time mean of the system state checked at the system state checking processing means;
    adaptive modulation selection processing means for performing adaptive modulation by controlling the mapping means and the complex IFFT means based on the channel state and the system state by using the output data of the timely optimizing processing means; and
    sub-channel selection processing means for adjusting assignment of sub-carriers by controlling the mapping means and the serial/parallel converting and guard interval inserting means based on the channel state and the system state by using the output data of the timely optimizing processing means.

5. The transmitting apparatus as recited in one of claim 1 to 4, wherein the temporally orthogonal coding (TOC) means includes:
    third serial/parallel converting means for performing serial-to-parallel conversion for the non-binary signal generated by the mapping means;
    orthogonal code multiplying means for multiplying the parallel data converted at the third serial/parallel converting means with a predetermined number of orthogonal codes, respectively; and signal synthesizing means for synthesizing the data outputted from the orthogonal code multiplying means.

6. A receiving apparatus of Code Division Multiple Access/Orthogonal Frequency Division Muliplexing (CDMA/OFDM) comprising:
   demodulating means for demodulating a signal transmitted from a transmitting apparatus by multiplying with an external RF;
   low pass filtering means for passing low frequency component of the analog signal demodulated at the demodulating means;
   analog/digital converting and guard interval inserting discarding means for converting the analog signal filtered by the low pass filtering means to digital data and discarding the guard interval from the converted digital data;
   complex Fast Fourier Transform (FFT) means for performing complex FFT for the output data of the analog/digital converting and guard interval inserting discarding means;
   first parallel/serial converting means for converting the parallel data from the complex FFT means to serial data;
   unique spreading code synthesizing means for de-spreading the serial data converted at the first parallel/serial converting means by multiplying with a unique spreading code;
   de-temporally orthogonal coding (de-TOC) means for converting the orthogonal data from the unique spreading code synthesizing means to non-binary signals having no orthogonality;
   de-mapping means for recovering binary data from the non-binary signals from the de-temporally orthogonal coding means; and
   serial/parallel converting means for performing serial/parallel conversion for the data recovered by the de-mapping means.

7. The receiving apparatus as recited in claim 6, further comprising de-interleaving means for de-interleaving the FFTed data from the complex FFT means to output to the first parallel/serial converting means.

8. The receiving apparatus as recited in claim 6 or 7, wherein the de-temporally orthogonal coding means includes:
   orthogonal code multiplying means for multiplying the parallel data de-spread at the unique spreading code synthesizing means with a predetermined number of orthogonal codes, respectively;
   integrating means for integrating the outputs of the orthogonal code multiplying means, respectively, to recover transmitted data; and
   second parallel/serial converting means for converting the parallel data recovered at the integrating means to serial data.

9. A transmitting method for use in a transmitting apparatus of Code Division Multiple Access/Orthogonal Frequency Division Muliplexing (CDMA/OFDM) comprising the steps of:
   (a) at first serial/parallel converting means, performing serial-to-parallel conversion for external data to be transmitted and, at mapping means, generating non-binary signals from the converted parallel data;
   (b) at temporally orthogonal coding (TOC) means, converting the generated non-binary signal to data having orthogonality;
   (c) at unique spreading code synthesizing means, spreading the converted orthogonal data by multiplying with a unique spreading code and, at second serial/parallel converting means, performing serial-to-parallel conversion for the spread data;
   (d) at complex Inverse Fast Fourier Transform (IFFT) means, performing IFFT for the parallel data converted at the step (c);
   (e) at parallel/serial converting and guard interval inserting means, performing serial-to-parallel conversion for the IFFTed data and inserting guard interval; and
   (f) at modulating means, modulating the guard interval inserted data by multiplying with an external RF and, at synthesizing means, synthesizing the modulated data to transmit to the air.

10. The transmitting method as recited in claim 9, further comprising the step (g) of, at interleaving means, interleaving the parallel data of the step (c), prior to performing complex IFFT at the step (d).

11. The transmitting method as recited in claim 9, further comprises the step (h) of, at adaptive modulating means, estimating channel state by using data from a receiving apparatus and controlling the mapping means of the step (a), the complex IFFT means of the step (d) and the parallel/serial converting and guard interval inserting means of the step (e) based on the estimated channel state.

12. The transmitting method as recited in claim 11, wherein the step (h) includes the steps of:
   (i) at channel state estimating means, receiving FFTed data for a received signal from the receiving apparatus, computing signal to noise ratio (SNR) of sub-channels of the transmitted data, and estimating channel state by using the SNR;
   (j) at system state checking processing means, checking system state due to system load of the transmitting apparatus itself;
   (k) at timely optimizing processing means, computing mean and variance for variation of the SNR computed at the step (i) and computing time mean of the system state checked at the step (j);
   (l) at adaptive modulation selection processing means, performing adaptive modulation by controlling the mapping means and the complex IFFT means of the step (d) based on the channel state and the system state by using the output data of the timely optimizing processing means of the step (k); and
   (m) at sub-channel selection processing means, adjusting assignment of sub-carriers by controlling the mapping means of the step (a) and the serial/parallel converting and guard interval inserting means of the step (e) based on the channel state and the system state by using the output data of the timely optimizing processing means of the step (k).

13. The transmitting method as recited in one of claim 9 to 12, wherein the step (b) includes:
   (n) at third serial/parallel converting means, performing serial-to-parallel conversion for the non-binary signal generated by the mapping means at the step (b);
   (o) at orthogonal code multiplying means, multiplying parallel data converted at the step (n) with a predetermined number of orthogonal codes, respectively; and
   (p) at signal synthesizing means, synthesizing the data outputted from the orthogonal code multiplying means of the step (o).

14. A receiving method for use in a receiving apparatus of Code Division Multiple Access/Orthogonal Frequency Division Multiplexing (CDMA/OFDM) comprising the steps of:
   (a) at demodulating means, demodulating a signal transmitted from a transmitting apparatus by multiplying with an external RF and, at low pass filtering means, passing low frequency component of the demodulated analog signal;

(b) at analog/digital converting and guard interval inserting discarding means, converting the analog signal filtered in the step (a) by the low pass filtering means to digital data and discarding the guard interval from the converted digital data;

(c) at complex FFT means, performing complex FFT for the output data of the analog/digital converting and guard interval inserting discarding means;

(d) at first parallel/serial converting means, converting the parallel data from the complex FFT means to serial data and, at unique spreading code synthesizing means, de-spreading the serial data converted at the first parallel/serial converting means by multiplying with a unique spreading code;

(e) at de-temporally orthogonal coding (de-TOC) means, converting the orthogonal data from the unique spreading code synthesizing means of the step (d) to non-binary signals having no orthogonality; and (f) at de-mapping means, recovering binary data from the non-binary signals from the de-temporally orthogonal coding means and, at serial/parallel converting means, performing serial-to-parallel conversion for the data recovered by the de-mapping means.

15. The receiving method as recited in claim 14, further comprising the step (q) of, at de-interleaving means, de-interleaving data that is complex FFTed at the step (c).

16. The receiving method as recited in claim 14 or 15, wherein the step (e) includes the steps of:

(h) at orthogonal code multiplying means, multiplying the parallel data de-spread at the step (d) with a predetermined number of orthogonal codes, respectively;

(i) at integrating means, integrating the outputs of the orthogonal code multiplying means at the step (h), respectively, to recover transmitted data; and (j) at second parallel/serial converting means, converting the recovered parallel data to serial data.

17. A computer readable recording medium embodied therein a program for implementing, in a transmitting apparatus of CDMA/OFDM having a processor, for transmission using orthogonal code and non-binary signal value, the functions of:

(a) at first serial/parallel converting means, performing serial-to-parallel conversion for external data to be transmitted and generating, at mapping means, non-binary signals from the converted parallel data;

(b) at temporarily orthogonal coding (TOC) means, converting the generated non-binary signal to data having orthogonality;

(c) at unique spreading code synthesizing means, spreading the converted orthogonal data by multiplying with a unique spreading code and, at second serial/parallel converting means, performing serial-to-parallel conversion for the spread data;

(d) at complex IFFT means, performing IFFT for the parallel data converted in the function (c);

(e) at parallel/serial converting and guard interval inserting means, performing serial-to-parallel conversion, for the IFFTed data and inserting guard interval; and (f) at modulating means, modulating the guard interval inserted data by multiplying with an external RF and, at synthesizing means, synthesizing the modulated data to transmit to the air.

18. The computer readable recording medium as recited in claim 17, wherein the program further implements the function (g) of, at interleaving means, interleaving the parallel data in the function (c), prior to performing complex IFFT of the function (d).

19. The computer readable recording medium as recited in claim 17 or 18, the program further implements the function (h) of, at adaptive modulating means, estimating channel state by using data from a receiving apparatus and controlling the mapping means of the function (a), the complex IFFT means of the function (d) and the parallel/serial converting and guard interval inserting means of the function (e) based on the estimated channel state.

20. A computer readable recording medium having embodied therein a program for implementing in a receiving apparatus of Code Division Multiple Access/Orthogonal Frequency Division Multiplexing (CDMA/OFDM) having a processor, a method for receiving a signal using orthogonal code and non-binary signal value, the method comprising:

(a) at demodulating means, demodulating a signal transmitted from a transmitting apparatus by multiplying with an external RF and, at low pass filtering means, passing low frequency component of the demodulated analog signal;

(b) at analog/digital converting and guard interval inserting discarding means, converting the analog signal filtered in the function (a) by the low pass filtering means to digital data and discarding the guard interval from the converted digital data;

(c) at complex FFT means, performing complex FFT for the output data of the analog/digital converting and guard interval inserting discarding means;

(d) at first parallel/serial converting means, converting the parallel data from the complex FFT means to serial data and, at unique spreading code synthesizing means, de-spreading the serial data converted at the first parallel/serial converting means by multiplying with a unique spreading code;

(e) at d e-temporally orthogonal coding (de-TOC) means, converting the orthogonal data from the unique spreading code synthesizing means of the function (d) to non-binary signals having no orthogonality; and (f) at de-mapping means, recovering binary data from the non-binary signals from the de-temporally orthogonal coding means and, at serial/parallel converting means, performing serial/parallel conversion for the data recovered by the de-mapping means.

21. The computer readable recording medium as recited in claim 20, the program further implements the function (g) of, at de-interleaving means, de-interleaving data that is complex FFTed in the function (c).

* * * * *